United States Patent [19]

Hobrock et al.

[11] Patent Number: 4,828,356
[45] Date of Patent: May 9, 1989

[54] METHOD FOR FABRICATION OF LOW EFFICIENCY DIFFRACTION GRATINGS AND PRODUCT OBTAINED THEREBY

[75] Inventors: Lowell M. Hobrock, Los Angeles; Hugh L. Garvin, Malibu; Roger J. Withrington, Los Angeles; Clarke T. Wellman, Gardena, all of Calif.

[73] Assignee: Hughes Aircraft Company, Los Angeles, Calif.

[21] Appl. No.: 136,665

[22] Filed: Dec. 22, 1987

[51] Int. Cl.⁴ .......................... G02B 5/18; G02B 27/44
[52] U.S. Cl. ............................... 350/162.17; 350/171; 350/320
[58] Field of Search .................. 350/162.23, 320, 164, 350/162.17–162.21, 171, 174

[56] References Cited
U.S. PATENT DOCUMENTS
4,281,894 8/1981 Guha .............................. 350/162.23

Primary Examiner—Bruce Y. Arnold
Attorney, Agent, or Firm—William J. Streeter; A. W. Karambelas

[57] ABSTRACT

A reflector and method for fabricating diffraction gratings in reflectors comprises the steps of placing one or more layers (38, 56–64) of a dielectric reflective enhancing material on a reflective surface (34, 54), and forming grooves (40, 66) only in the top layer (38, 64) of the dielectric material to form the gratings. Precise control of the efficiency is obtained by decreasing the thickness (b′, b″) of the grooved layer and adjusting the ratio (b′/b″) of the material under the grooves and adjacent to the grooves.

12 Claims, 2 Drawing Sheets

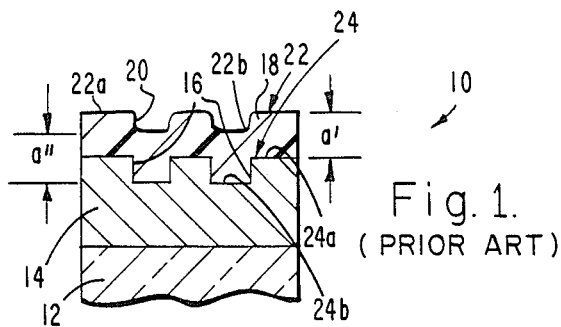
Fig. 1. (PRIOR ART)
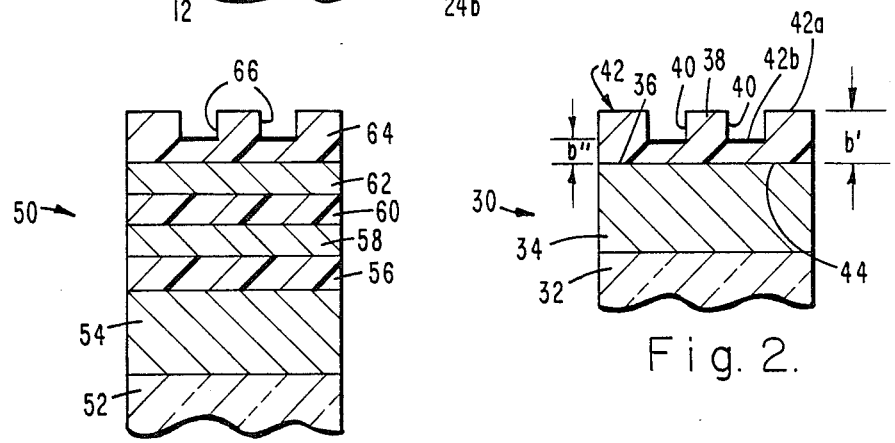
Fig. 5.
Fig. 2.
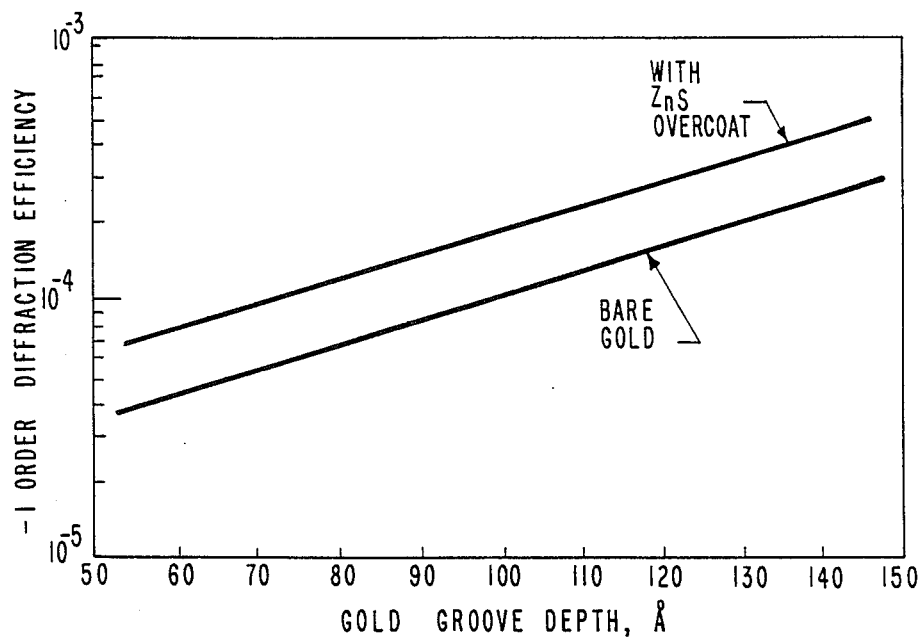
Fig. 3.

METHOD FOR FABRICATION OF LOW EFFICIENCY DIFFRACTION GRATINGS AND PRODUCT OBTAINED THEREBY

BACKGROUND OF THE INVENTION

The present invention relates to diffraction gratings and, in particular, to a method for fabrication of low efficiency diffraction gratings and the product obtained thereby.

Diffraction gratings are useful for sampling beams of electromagnetic radiation to analyze the purity of the beam, such as the uniformity of its wavefront, and to determine the beam direction. Information from the analysis enables the beam to be better directed or to enable its wavefront quality, e.g., its coherency, phase and uniformity, to be improved.

The type of diffraction grating used for typical beam sampling applications includes a reflective surface on a substrate with one or more layers of dielectric reflective enhancing material on the reflective surface. A conventional grating, such as is illustrated in FIG. 1 herein, comprises grooves in the reflective surface with the dielectric material deposited thereon. The depth of the grooves or grating affects the efficiency of the diffraction; in general, the greater the depth, the greater the diffraction efficiency within the range of operation in sampling efficiencies of a few percent, e.g., 1% 5%, to 80%.

Such low diffraction efficiency gratings for laser beam sampling are formed by etching grooves into the metal reflector. For low power lasers, the grooves can be relatively deep, e.g., 300 Angstroms or greater. However, newer lasers have been developed with increased power and, as the laser power has increased or become more intense, the sample taken must be a smaller fraction of the total beam intensity to avoid harm to the analyzing equipment. When such a smaller fraction is taken, the required diffraction efficiency of the ratings decreases to the extent where it is less than 0.0002. Thus, to achieve such very low diffraction efficiencies, the grating groove depths must be shallower than previously made, that is, to depths of less than 150 Angstroms.

Two factors must be considered when shallower gratings are employed, viz., the control of the depth of the grooves when they reach depths of 100 Angstroms or less, and the affect of the dielectric coating over the grating. With respect to the latter, the application of a dielectric coating over the rating sometimes leads to sampling efficiencies which are difficult to predict or control, and result in gratings that are subject to anomalous effects, such as waveguiding of diffracted beams between the dielectric layers. This occurs because, in the prior approaches, the ratings are placed in the reflective surface, with the dielectric overcoat or film being placed thereon, as a conformal coat. Such an overcoat decreases the depth of the gratings in proportion to the thickness of the dielectric coating, and causes the shape of the ratings to become less distinct, both of which become even greater problems as the dielectric coating increases in thickness. The result is an increasingly poorly defined grating for sampling, that is, its corners become rounded and its depth more shallow. With regard to the former, as the depths of the grooves of the ratings are reduced in size to accommodate the higher levels of laser energy, the deleterious effect of the dielectric coating becomes greater. Furthermore, every layer in the dielectric overcoat becomes modulated by the grating, leading to complex interactions between the grating and the coatings.

In addition, the conventional processing steps for fabricating diffraction gratings create further problems. This fabrication technique comprises the steps of (1) placing a mirror surface on a substrate in a vacuum film deposition chamber, (2) removing the substrate with the mirror surface from the chamber, (3) coating the metal mirror with a photoresist, (4) exposing the photoresist with a holographic grating pattern, (5) developing the pattern into the photoresist, (6) ion etching the grating through the photoresist pattern into the metal, (7) removing the photoresist pattern with a solvent rinse, leaving the grating pattern in the metal, and (8) placing one or more layers of dielectric reflective enhancing material on the thus processed substrate with the grating pattern therein. This processing increases the likelihood of contamination and/or defects, such as film delamination and other failures.

SUMMARY OF THE INVENTION

The present invention both simplifies the number of processing steps conventionally used and, at the same time, avoids the deleterious effect on the shape and depth of the ratings. The present invention further enables the diffraction efficiency of the ratings to be precisely controlled.

In general, a dielectric reflective enhancing material is placed on an ungrooved reflective surface, and grooves are formed in the dielectric material itself to form the diffraction gratings, e.g., holographic gratings. If the dielectric material comprises several layers of different materials, the grooves are formed only in the uppermost layer of dielectric material. Further, the diffraction efficiency is precisely controlled by a reduction in thickness of the uppermost layer which enables the groove depth to remain constant, but the thickness of the dielectric layer to be decreased.

Several advantages are derived therefrom. The groove depth can be precisely made. The diffraction efficiency of the ratings can be precisely tailored to an optimal value.

Other aims and advantages, as well as a more complete understanding of the present invention, will appear from the following explanation of exemplary embodiments and the accompanying drawings thereof.

DESCRIPTION OF THE DRAWINGS

FIG. 1 is a cross-section of a grating formed according to prior art techniques;

FIG. 2 is a cross-section of a grating formed in accordance with the teachings of the present invention;

FIG. 3 is a graph showing the diffraction efficiency versus groove depth for ratings in a base metal with and without a dielectric overcoat for the prior art design of FIG. 1;

FIG. 5 is a cross-sectional view of a second embodiment of the present invention illustrating several layers of dielectric material on a reflective surface.

DETAILED DESCRIPTION OF THE INVENTION

Figure 4:
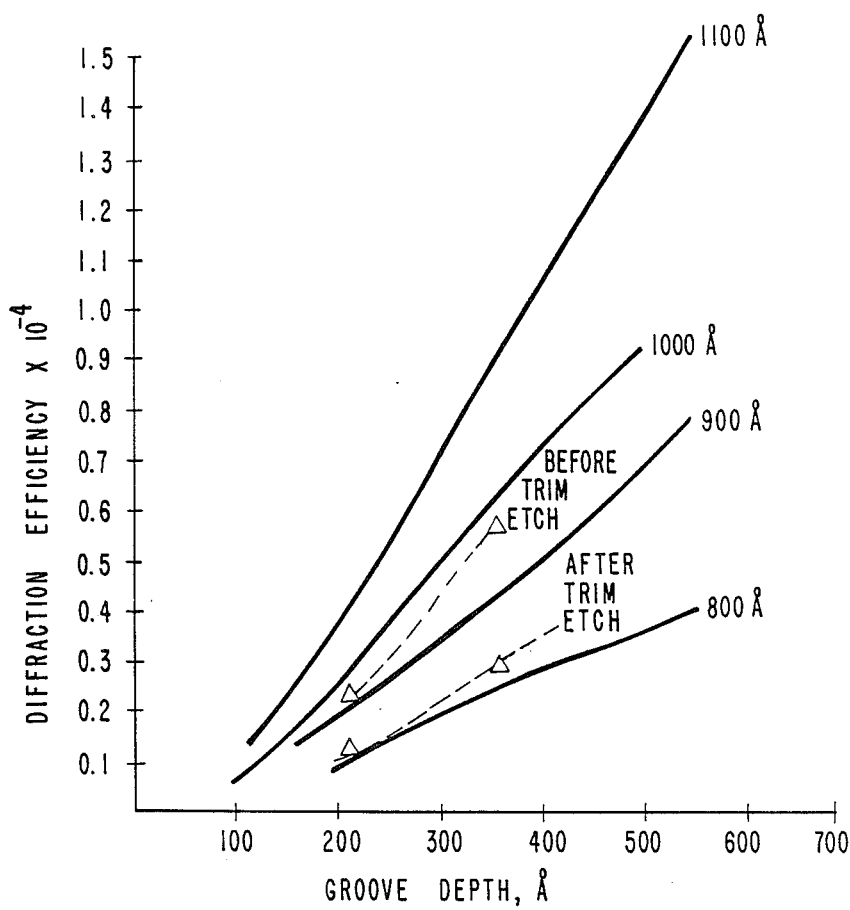
FIG. 4 is a graph showing theoretical diffraction efficiency in solid lines and measured diffraction efficiency in dotted lines for a zinc sulfide dielectric coating on a gold reflective surface taken at 3.39 micrometers wavelength.

FIG. 1 depicts, in cross-section, a grating 10 formed according to existing prior art techniques. Grating 10 comprises a substrate 12 having a metal reflective surface 14 thereon. Metal surface 14 is etched with a plurality of grooves 16 formed, for example, by ion beam etching. A dielectric reflective enhancing material 18 is then coated on grooved metal surface 14 in a conformal manner and, therefore, replicates metal surface grooves 16 as dielectric material grooves 20. Because of this replication, grooves 20 are shown to have somewhat rounded corners because the coating does not exactly reproduce the sharpness of metal surface grooves 16.

Dielectric material 18 thus is provided with a top tooth shaped surface 22 and a common tooth shaped surface 24, in common with metal reflecting surface 14. Surface 22 has an upper portion 22a and a lower portion 22b. Portion 22b forms the bottom surface of grooves 20. Likewise, surface 24 has upper and lower portions 24a and 24b, with portion 24b defining the contact with the bottom of metal grooves 16. Accordingly, the thicknesses of dielectric material 18 may be identified by the distance between portions 22a and 24a as thickness a' and the distance between portions 22b and 24b as thickness a''. The relevance of thicknesses a' and a'' will become apparent hereinafter when the prior art construction of FIG. 1 is compared with the inventive construction FIG. 2.

Referring now to FIG. 2, a grating 30, formed in accordance with the teachings of the present invention, comprises a substrate 32 having a metal reflective surface 34 thereon. Unlike the conventional grating 10 illustrated in FIG. 1, metal reflective surface 34 of the present invention has a surface 36 which is flat and uninterrupted by any grooves or gratings. An optically transparent dielectric reflective enhancing material 38 is deposited on metal surface 34. Grooves 40 are formed in dielectric material 38 and, therefore, form the dielectric material into grooved and ungrooved portions. Thus, dielectric material 38 has a top surface 42 defined by an upper portion 42a and a lower portion 42b, where the lower portion defines the base of grooves 40. Dielectric material 38 also has a surface 44 which is flat and uninterrupted, as a consequence of its contract with surface 36 of metal reflective surface 34. As a result, dielectric reflective enhancing material 38 has two thicknesses, a larger b' between surface portion 42a and surface 44 and a smaller thickness b'' between lower surface portion 42b and surface 44. There is, therefore, a difference in thickness b' and b'' of the grating shown in FIG. 2 while there is essentially the same thicknesses a' and a'' of the prior art construction shown in FIG. 1, which leads to an important enhancement distinction between the present invention and the prior art.

This distinction will become apparent during the following description of the method of fabricating the holographic ratings of the present invention.

A preferred technique for forming the gratings illustrated in FIG. 2 utilizes the following steps. A substrate, such as substrate 32, is placed within a vacuum film deposition chamber whose design and operation are both conventional. This chamber may be the same type used for making gratings such as grating 10 depicted in FIG. 1. A metal reflective layer, such as reflective layer 34, is then formed on the substrate, utilizing conventional techniques.

However, in a departure from the method utilized to fabricate prior art ratings, substrate 32 with its reflective metal surface 34 is then left in the same chamber and at the same pump-down, in order that the desired dielectric reflective enhancing film, such as material 42, or several films as are illustrated in FIG. 5, are applied by conventional processing and to a thickness or thicknesses corresponding to the reflectivity needed at the wavelength(s) of the laser beam(s).

Gratings, such as grooves 40, are then etched into the dielectric film rather than in the mirror surface itself. First, a photoresist is placed on surface 42 which, at this point, is flat and undefined. A holographic pattern is exposed in the resist, by conventional photoresist and laser holographic techniques. This holographic pattern is developed by standard photographic techniques, leaving a photoresist grating mask on the dielectric film. Then, an ion beam etches the grating into the dielectric film, also by standard ion beam techniques. While chemical etching can be used, ion beam etching is preferred as providing more accurate grooving and grating. A typical grating thus provided has a depths of less than 150 Angstroms with a tolerance of ±14 Angstroms. This provides a uniformity of ±20% in diffraction efficiency. The photoresist pattern is then stripped from dielectric film 42.

As an added feature, obtainable only through the teachings of the present invention, the diffraction efficiency of the grating can be precisely adjusted after etching and photoresist stripping. The diffraction efficiency is dependent upon two factors specifically, the thickness of dielectric film 42 and the thickness of the dielectric film below grooves 40, as determined by the depth of the grating etched into the film. The first factor of film thickness provides an initial diffraction efficiency, which is dependent upon the depth of each groove of the grating. The second factor enables the initial diffraction efficiency, created by the first factor, to be precisely set by adjusting the overall thicknesses of the film. In this respect, the difference between prior art processes in forming a grating, such as shown in FIG. 1, and the gratings obtainable by means of the present invention, as shown in FIG. 2, becomes apparent. In the prior ratings of FIG. 1, as the material of film 18 is removed, the thicknesses a' and a'' decrease in equal amounts and, therefore, remain equal and form a non changeable ratio. Thus, the diffraction efficiency of the grating of FIG. 2 can be precisely adjusted by a careful change in the thickness ratio. This change is achieved, for example, by again placing the grating in the ion etch chamber after stripping the photoresist, and then uniformly etching the top layer to reduce its thickness.

As is known, the diffraction efficiency of gratings is dependent upon the relative phases between the energy reflected through the different thicknesses, which is not possible through a uniform thickness. This also allows the grating to have a large dynamic range in diffractive efficiencies designable to over six orders of magnitude, for example, from $7 \times 10^{-1}$ to $10^{-6}$.

Examples of materials used include an aluminum, silver or gold mirror surface for surface 34. Dielectric material 38 may comprise silicon dioxide, zinc sulfide, zinc selinide, thorium fluoride, and aluminum oxide ($Al_2O_3$).

A comparison of prior art gratings and the inventive grating is shown by comparison between the graphs illustrated in FIGS. 3 and 4. FIG. 3 is based upon results taken from diffraction gratings such as shown in FIG. 1, while the graph of FIG. 4 is taken from tests from the gratings of FIG. 2. In addition, FIG. 3 also illustrates the comparison of the predicted grating efficiency as a function of groove depth between a bare gold reflective surface and a gold surface with a zinc sulfide dielectric material overcoat. From this data, it is seen that, for the same ±20% variation in diffraction efficiency, the groove depth only needs to be controlled to within ±50 Angstroms for the present invention. According to prior art techniques, the groove depth must be controlled to within ±10 Angstroms for the grating.

Further, an additional parameter, the thickness of the overcoat layer, is available to control the diffraction efficiency as shown in FIG. 4. This added control allows the optical overcoat layer to be deposited thicker and the groove depth etched deeper than required by the optimum design point which results in the diffraction efficiency being too high. Then, the diffraction efficiency can be finely adjusted to the desired value by trim-etching the dielectric overcoat thickness after the grating has been etched into the top film. This added control on diffraction efficiency relaxes the tolerance on the absolute thickness of the dielectric overcoat thickness and the grating groove depth.

This process can also be extended to multi-layer dielectric coatings as shown in FIG. 5. Here, a grating 50 comprises a substrate 52 with a metal reflective surface 54 thereon. Atop surface 54 are several dielectric reflective enhancing layers 56, 58, 60, 62 and 64. Grooves 66 are etched only into the uppermost dielectric layer 64. It has been found detrimental if the grooves extend into lower films. For this purpose, dielectric layer 64 is made thicker than the other layers to enable the etching of the groove depth and the adjustment of the thickness of layer 64.

By placing the grooves in the film, it enables as many film layers to be used as are required for the end product, without any change in groove depth. Compared to the prior art, the groove depth changes as the dielectric increases in thickness. Because most reflection is in the upper layers, if a groove depth is lessened, it is more difficult to obtain the desired reflection, which adversely effects the diffraction efficiency and the increased adversity as the layers become thicker or increase in number.

As shown in FIG. 4, a comparison of predicted and measured data is taken at 3.39 micrometers wavelength. The presentation format is −1 order diffraction efficiency versus groove depth. The theoretical curves are solid and are labeled with the corresponding zinc sulfide overcoat thickness. The experimental points are shown as triangles and are connected by dashed lines. The experimental data was taken on a sample before and after an ion trim etch was performed. This is shown by the vertical distance between the two curves denoted "before trim etch" and "after trim etch" which, in the example illustrated by the graph of FIG. 4, is a 200 Angstrom difference in thickness. Trim etching uniformly removes overcoat material, decreases the overcoat layer thickness, but maintains the same groove depth. The experimental data thus confirmed one of the key benefits of the present invention which was predicted from theory, viz., since the efficiency depends on groove depth and on overcoat thickness, the efficiency can be precisely adjusted after the grating has been put into the overcoat, by trim etching the thickness of the overcoat layer.

Although the invention has been described with respect to particular embodiments thereof, it should be realized that various changes and modifications may be made therein without departing from the spirit and scope of the invention.

What is claimed is:

1. For use with a reflector having dielectric reflective enhancing material on a reflective surface with grooves in the material to form the material into grooved and ungrooved portions and thus to define diffraction gratings, a method for controlling the diffraction efficiency of the diffraction gratings, comprising the step of adjusting the respective thicknesses of the grooved and the ungrooved portions.

2. A method for fabricating diffraction gratings in a reflector provided with a substrate having a reflective surface, comprising the steps of:
   placing dielectric reflective enhancing and/or protective material on the reflective surface to provide the material with an exposed upper surface; and
   forming grooves in the exposed upper surface of the dielectric material to form the gratings.

3. A method according to claim 2 further comprising the step of forming the dielectric material in several layers, said groove forming step being conducted in only the uppermost layer.

4. A method for fabricating diffraction gratings in a reflector provided with a substrate having a reflective surface, comprising the steps of:
   placing dielectric reflective enhancing and/or protective material on the reflective surface;
   forming grooved and ungrooved portions in the dielectric material to form the gratings; and
   adjusting the ratio in the thicknesses between the grooved and ungrooved portions of the dielectric material for controlling the diffraction efficiency of the gratings.

5. A method according to claim 4 wherein the grooved dielectric material has a generally square-toothed surface configuration defined by lower surface portions in the grooves and upper surface portions above the lower surface portions, and in which said adjusting step comprises the steps of:
   controlling the depth of the grooves between the surface portions during said forming step for providing an initial diffraction efficiency of the gratings; and
   removing exposed portions of the dielectric material from both the upper and lower surface portions for adjusting the diffraction efficiency to an optimal value.

6. A method for fabricating diffraction gratings in reflectors comprising the steps of:
   placing a substrate in vacuum film deposition chamber and evacuating the chamber to a suitable pressure below atmospheric pressure;
   applying a reflective metal surface on the substrate by vacuum film deposition techniques;
   in the same chamber and at the same pressure, applying at least one dielectric reflective enhancing film on the reflective metal surface to a thickness corresponding to the reflectivity desired and the wavelength of operation;
   placing a photoresist on the uppermost surface of the dielectric film;
   forming a holographic pattern in the photoresist by laser holographic techniques;

ion beams etching grooves defining a grating into the dielectric film as defined by the holographic pattern;

removing the photoresist; and ion beam etching the dielectric reflective enhancing film for adjusting the relative thicknesses of the dielectric reflective enhancing film defining the grooves with respect to the remainder of the dielectric reflective enhancing film.

7. A method according to claim 6 wherein said groove etching step is controlled to define gratings of less than 150 ±14 Angstroms for obtaining a uniformity of ±20% in diffraction efficiency.

8. A method according to claim 7 further comprising the step of forming the dielectric material in several layers, said groove etching step being conducted in only the uppermost layer.

9. A reflector having a diffraction grating comprising:

a substrate having a reflective surface;

dielectric reflective enhancing material on the active surface, said material having an exposed surface; and grooves in the exposed surface of the dielectric material forming the grating.

10. A reflector according to claim 9 in which the dielectric material comprises several layers, and said grooves are formed in only the uppermost layer.

11. A reflector having a diffraction grating comprising:

a substrate having a reflective surface;

several layers of dielectric reflective enhancing material on the reflective surface; and grooved and ungrooved portions in the uppermost layer of the dielectric material forming the grating, said grooved portion having a thickness which is adjusted with respect to the thickness of the ungrooved portions for controlling the diffraction efficiency of the grating.

12. A reflector according to claim 10 in which individual ones of the layers of the dielectric material consist of aluminum oxide and zinc sulfide.

* * * * *

UNITED STATES PATENT AND TRADEMARK OFFICE
CERTIFICATE OF CORRECTION

PATENT NO. : 4,828,356

DATED : May 9, 1989

INVENTOR(S) : Lowell M. Hobrock, Hugh L. Garvin, Roger J. Withrington, and Clark T. Wellman It is certified that error appears in the above-identified patent and that said Letters Patent is hereby corrected as shown below:

Column 2, line 57, delete "ratings" and insert therefor -- gratings --.

Column 4, line 2, delete "ratings" and insert therefor -- gratings --.

Column 7, line 1, delete "ion beams" and insert therefor -- ion beam --.

Column 8, line 1, delete "active" and insert therefor -- reflective --.

Signed and Sealed this

Thirtieth Day of April, 1991

Attest:

HARRY F. MANBECK, JR.

*Attesting Officer*      *Commissioner of Patents and Trademarks*